Patented June 23, 1931

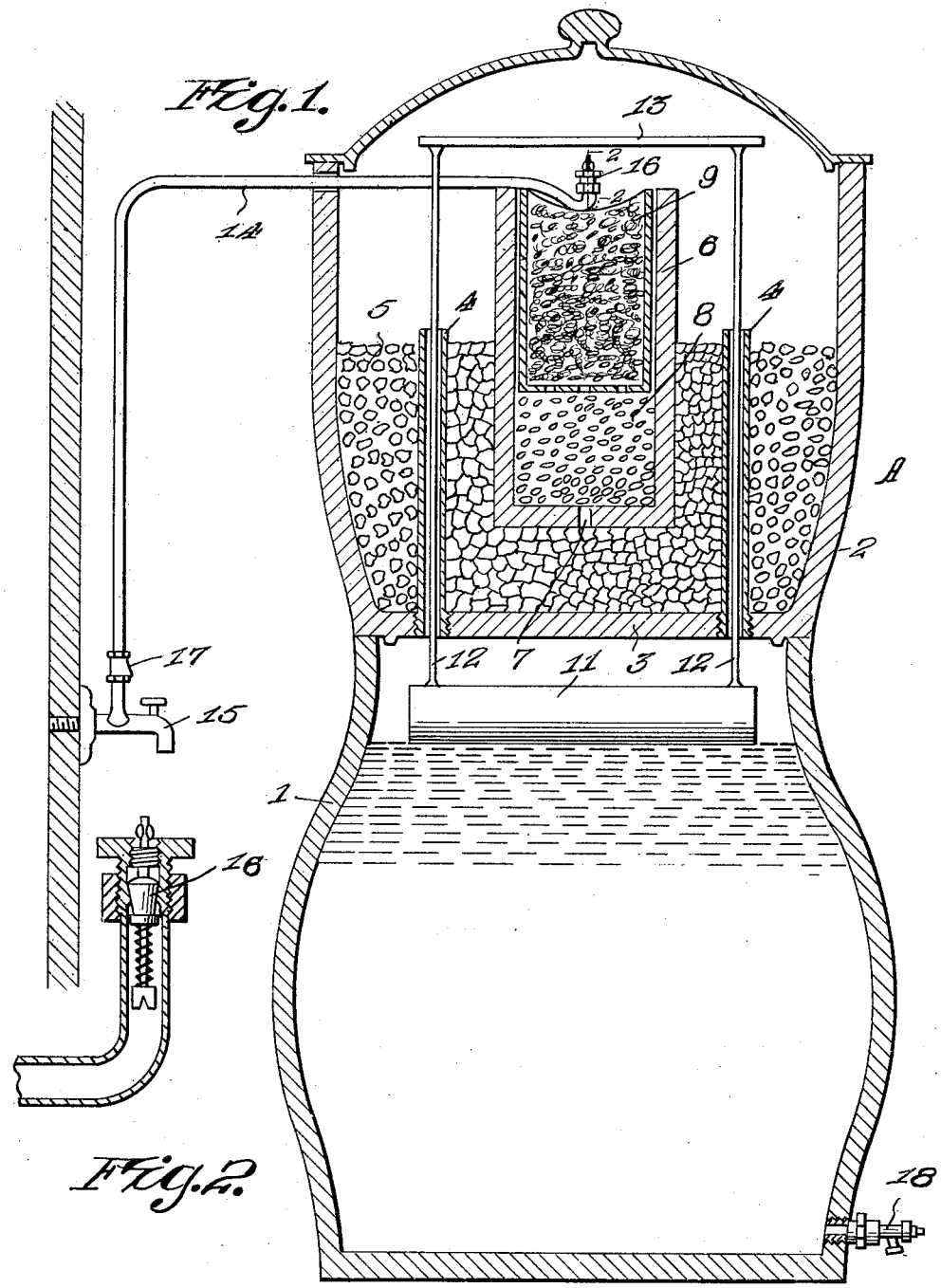

1,811,755

UNITED STATES PATENT OFFICE

VIRGIL S. JOHNSTON, OF HUNTINGTON PARK, CALIFORNIA

WATER FILTER

Application filed October 6, 1930. Serial No. 486,839.

This invention relates to a water filter, the general object of the invention being to provide means for attaching the filter to a water supply, with float operated means for controlling a valve in the supply pipe so as to keep the filtered water in the device at a constant level and thus make the device self-filling.

Another object of the invention is to provide a chamber having filtering means thereon through which the water passes from the supply pipe and a second chamber having filtering means therein through which the water from the first chamber passes before reaching the chamber which contains the filtered water so that the water is thoroughly filtered before being used.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a sectional view through the device.

Figure 2 is a section on line 2—2 of Figure 1.

In the drawings, the letter A indicates the combined water holder and filter which consists of the lower part 1 and the upper part 2, the lower part being designed to hold the filtered water and the upper part receiving the water to be filtered and containing the filtering material. The upper part 2 is formed with a bottom 3 and tubes 4 have their lower ends threaded in holes in the bottom 3, with their upper ends extending above the filtering material 5 placed in the part 2. This filtering material may be bone charcoal.

A jar or small receptacle 6 has its lower half embedded in the filtering material 5 and said jar has a hole 7 in its bottom and silica granite 8 or the like is placed in the lower part of the jar. A small container 9 is placed in the jar and has its perforated bottom resting on the material 8. This member 9 is preferably formed of aluminum and contains asbestos and mineral wool, indicated at 10. A cylindrical float 11, preferably of glass, is arranged in the part 1 and rods 12 are connected at their lower ends to the float, these rods passing through the tubes 2 and having their upper ends connected together by a bar 13.

A pipe 14 is connected to a faucet 15 or other part of the water supply system of the building or dwelling in which the filter is placed and a valve 16, which may be similar to the well known Schrader valve used in automobile tires, is placed in the discharge end of the pipe, which is bent upwardly as shown and arranged over the container 9 and under the bar 13. A check valve 17 is arranged in the lower end of the pipe 14. A faucet 18 is located in the lower part of the member 1 for drawing water from said member.

From the foregoing it will be seen that the water flowing from the pipe 14 must pass through the filtering material in the member 9 and after passing through said material, the water will pass through the perforations in the bottom of said member, through the material 8 in the lower part of the member 6 and then through the hole 7 in said member 6 into the material 5. As the water cannot escape from the part 2 until it rises through the material 5, the water must pass through the entire body of the material 5 and then the water will flow into the tubes 4 and pass through these tubes into the member 1. Thus the water reaching the member 1 is thoroughly filtered. The valve 6 is, of course, held to its seat under normal conditions, but when some of the water is removed from the member 1 by the opening of the faucet 18, the float will drop and thus the bar 13 will engage the stem of the valve 16 and move said valve off its seat so that water can flow from the pipe 14 and after passing through the filtering material, will replace the water removed from the part 1. As soon as the water reaches its normal level in part 1, the float moves the bar 13 off the valve so that the same will close. Thus the level of filtered water in part 1 remains constant and the device is self-filling. The tubes 4 not only act as overflow tubes for permitting the water from the filter means to pass into the part 1, but they also act as guiding means for the float rods.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A filter of the class described comprising upper and lower receptacles, a tube passing through the bottom of the upper receptacle and extending to a point well above the bottom of the said receptacle, filtering material in the upper receptacle through which the tube passes, a small container in the upper receptacle having an opening in its bottom, filtering material in the small container, said small container having its lower part embedded in the filtering material in the upper receptacle, a float in the lower receptacle, a rod connected with the float and passing through the tube, a projection on the upper end of the float, a supply pipe extending into the upper receptacle and arranged above the small container therein and a normally closed valve in the pipe engaged by the projection on the rod when the float lowers to open the valve.

2. A filtering device of the class described comprising upper and lower receptacles, filtering material in the upper receptacle, tubes threaded in the bottom of the upper receptacle and extending to a point above the filtering material therein, a small container having a hole in its bottom and arranged in the upper receptacle with its lower portion embedded in the filtering material, filtering material in the lower part of said small container, an inner container in the upper portion of the small container and having a perforated bottom, filtering material in the container, a supply pipe passing into the upper receptacle with its discharge end bent upwardly and arranged over the material in the container, a float in the lower receptacle, rods connected with the float and passing through the tubes, a cross piece connecting the upper ends of the rods together and engaging the valve to open the same when the float moves downwardly.

In testimony whereof I affix my signature.

VIRGIL S. JOHNSTON.